(12) United States Patent
Lee et al.

(10) Patent No.: US 12,510,076 B2
(45) Date of Patent: Dec. 30, 2025

(54) ELECTRIC COMPRESSOR

(71) Applicant: Hanon Systems, Daejeon (KR)

(72) Inventors: Hyun Woo Lee, Daejeon (KR); Min Gyu Kim, Daejeon (KR); Sang Woo Bae, Daejeon (KR); Hye Rim An, Daejeon (KR); Hew Nam Ahn, Daejeon (KR); Sung Taeg Oh, Daejeon (KR); Je Su Yun, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/261,251

(22) PCT Filed: Oct. 12, 2022

(86) PCT No.: PCT/KR2022/015433
§ 371 (c)(1),
(2) Date: Jul. 12, 2023

(87) PCT Pub. No.: WO2023/068643
PCT Pub. Date: Apr. 27, 2023

(65) Prior Publication Data
US 2024/0271622 A1 Aug. 15, 2024

(30) Foreign Application Priority Data
Oct. 21, 2021 (KR) .......................... 10-2021-0141377

(51) Int. Cl.
F04C 23/02 (2006.01)
F04B 35/04 (2006.01)
(Continued)

(52) U.S. Cl.
CPC .............. F04C 23/02 (2013.01); F04B 35/04 (2013.01); F04B 49/065 (2013.01);
(Continued)

(58) Field of Classification Search
CPC .. F04C 23/02; F04C 18/0215; F04C 2240/30; F04C 2240/403; F04C 2240/803;
(Continued)

(56) References Cited

U.S. PATENT DOCUMENTS

2014/0076434 A1* 3/2014 Fukasaku .............. F04C 23/008
137/565.01
2017/0276136 A1* 9/2017 Kinoshita ............... F04C 29/12
(Continued)

FOREIGN PATENT DOCUMENTS

JP 2014058910 A 4/2014
JP 2020045895 A 3/2020
(Continued)

OTHER PUBLICATIONS eepower.com; Intelligent Power Modules (IPMs)_ Concepts, Features, and Applications—Technical Articles pdf from https://eepower.com/technical-articles/intelligent-power-modules-ipms-concepts-features-and-applications/# (Year: 2025).*

Primary Examiner — David N Brandt
(74) Attorney, Agent, or Firm — Shumaker, Loop & Kendrick, LLP; James D. Miller

(57) ABSTRACT

An electric compressor, including: a housing; a compression unit provided in the housing; a motor unit provided in the housing to drive the compression unit; and an inverter unit coupled to one side of the housing and controlling the motor unit, and the inverter unit includes: a support body disposed on one side of the housing; and an inverter cover coupled to one side of the support body; and the support body includes: a center part allowing a circuit board to be seated thereon; and a first receiving part extending from the center part toward a radially outer side of the center part, and having a noise reduction element disposed therein.

11 Claims, 8 Drawing Sheets

(51) Int. Cl.
  *F04B 49/06* (2006.01)
  *F04C 18/02* (2006.01)
  *H02K 11/01* (2016.01)
  *H02K 11/33* (2016.01)
(52) U.S. Cl.
  CPC ...... *F04C 18/0215* (2013.01); *H02K 11/0141* (2020.08); *H02K 11/33* (2016.01); *F04C 2240/30* (2013.01); *F04C 2240/403* (2013.01); *F04C 2240/803* (2013.01); *F04C 2240/808* (2013.01)
(58) Field of Classification Search
  CPC .. F04C 2240/808; F04B 35/04; F04B 49/065; H02K 11/0141; H02K 11/33; H02K 11/30; H02K 5/225; H02M 7/003; F16B 37/065; F16B 5/02
  See application file for complete search history.

(56) References Cited

U.S. PATENT DOCUMENTS

| | | | |
|---|---|---|---|
| 2018/0266420 A1* | 9/2018 | Lee | F04B 39/121 |
| 2020/0313504 A1* | 10/2020 | Okochi | F04C 29/0085 |
| 2020/0321836 A1 | 10/2020 | Kagawa et al. | |
| 2021/0013769 A1* | 1/2021 | Kobayashi | F04C 23/008 |
| 2021/0239106 A1* | 8/2021 | Okochi | F04B 35/04 |
| 2024/0097535 A1* | 3/2024 | Lee | F25B 31/026 |

FOREIGN PATENT DOCUMENTS

| | | |
|---|---|---|
| JP | 2020153241 A | 9/2020 |
| JP | 2021120542 A | 8/2021 |
| KR | 20160104397 A | 9/2016 |
| KR | 20170040068 A | 4/2017 |
| KR | 20210002203 A | 1/2021 |
| KR | 20210097631 A | 8/2021 |

* cited by examiner

ELECTRIC COMPRESSOR

CROSS REFERENCE TO RELATED PATENT APPLICATIONS

This is a U.S. national phase patent application of PCT/KR2022/015433 filed Oct. 12, 2022 which claims the benefit of and priority to Korea Patent Application No. 10-2021-0141377 filed on Oct. 21, 2021, the entire contents of each of which are incorporated herein by reference.

FIELD

The present disclosure relates to an electric compressor, and more particularly, an electric compressor capable of reducing a size and lightening weight of a package of an inverter unit, as a noise reduction element is disposed on a radially outer side of a circuit board of an inverter unit, and a high voltage connector, a noise reduction element, and a low voltage connector are integrated into a support body.

BACKGROUND

Generally, air conditioning (A/C) apparatuses for cooling or heating passenger compartments are installed in vehicles. Such an air conditioning apparatus includes a compressor, which compresses low-temperature and low-pressure gaseous refrigerant drawn from an evaporator into a high-temperature and high-pressure gaseous state, and transfers it to a condenser.

Compressors applied to such vehicles include a mechanical compressor that is driven by receiving the driving force of the engine and an electric compressor that uses a motor driven by electricity, and in recent years, the use of electric compressors has increased as the vehicle electrification has been accelerated.

Meanwhile, examples of the compressor include a reciprocating compressor that compresses a refrigerant according to which pistons reciprocate, and a rotary compressor that compresses a refrigerant while rotating. The reciprocating compressor includes a crank compressor that transmits a driving force from a drive source to a plurality of pistons using a crank, a swash plate compressor that transmits a driving force from a drive source to a shaft installed with a swash plate, and the like, according to the power transmission from the drive source. The rotary compressor includes a vane rotary compressor that utilizes a rotating rotary shaft and a vane, and a scroll compressor that utilizes an orbiting scroll and a fixed scroll.

In addition, in the field of the electric compressor, the development of an inverter-type compressor capable of varying the operating speed of the motor is being actively conducted. In the inverter-type electric compressor, the inverter is mounted on an outer circumferential surface or one side of a casing, and the inverter is electrically connected to a motor provided inside the casing using terminals and bus bars passing through the casing.

Here, in the conventional electric compressor, a noise reduction element for reducing high-frequency noise is disposed in a circuit board of the inverter. For example, referring to a motor compressor disclosed in Korean patent application publication No. 2020/0115215, a common mode choke coil 34 is mounted on a circuit board 29 of the inverter, and by doing so, transmission of the high frequency noise generated from the PCU 39 on the vehicle side to the inverter circuit 31 on the compressor side is suppressed.

In this way, as the noise reduction element is disposed inside the inverter cover member 25 on the circuit board 29, an area of the circuit board 29 increases, so that a width and height of the inverter cover member 25 must also increase. Therefore, there is a problem in that it is difficult to reduce the package and make it lightweight.

Moreover, since the connector 27 is provided on an outside of the inverter cover member 25 and protrudes in an opposite direction of the motor, the overall length of the electric compressor is also increased.

SUMMARY

An object of the present disclosure is to provide an electric compressor capable of reducing and lightening the package of the inverter unit by disposing a noise reduction element radially outside the circuit board of the inverter unit and integrating a high voltage connector, a noise reduction element, and a low voltage connector into a support body.

The technical problem to be achieved by the present disclosure is not limited to the above-mentioned technical problem, and other technical problems that are not mentioned will be clearly understood by ordinary-skilled persons in the art to which the present disclosure pertains from the following description.

One embodiment is an electric compressor, including: a housing; a compression unit provided in the housing; a motor unit provided in the housing to drive the compression unit; and an inverter unit coupled to one side of the housing and controlling the motor unit, and the inverter unit includes: a support body coupled to one side of the housing; and an inverter cover coupled to one side of the support body; and the support body includes: a center part allowing a circuit board to be seated thereon; and a first receiving part extending from the center part toward a radially outer side of the center part, and having a noise reduction element disposed therein.

According to an embodiment, the support body may further include a second receiving part disposed in a line on a radially outer side of the first receiving part and has a high voltage connector disposed therein.

According to an embodiment, the support body may further include: a third receiving part extending from the center part toward the radially outer side of the center part and having a low voltage connector disposed therein.

According to an embodiment, the first receiving part and the third receiving part may extend in parallel toward the same direction from the center part.

According to an embodiment, the inverter cover may cover the center part and the first receiving part.

According to an embodiment, the electric compressor may further include: a metal electromagnetic wave shielding member surrounding the support body.

According to an embodiment, sealing members may be disposed between the inverter cover and the support body and between the support body and the housing, respectively.

According to an embodiment, a speed rivet may be installed to penetrate the circuit board and the support body, and a bolt may be installed to the housing by penetrating the speed rivet.

According to an embodiment, a fastening member may be installed to the housing by penetrating the inverter cover and the support body.

According to an embodiment, an intelligent power module (IPM) connected to the circuit board may be in contact with the housing.

According to an embodiment, a protrusion protruding toward the support body may be provided on one side of the housing so as to be contactable with the intelligent power module (IPM).

According to an embodiment, the high voltage connector may be connected to the noise reduction element through a first bus bar, and the noise reduction element may be connected to the circuit board through a second bus bar.

According to an embodiment, the noise reduction element may be welded to the first bus bar and the second bus bar, respectively.

According to an embodiment, the noise reduction element may be a common mode (CM) choke.

According to the present disclosure, a size of the circuit board can be reduced and a length of the inverter cover can also be reduced, as the noise reduction element is disposed outside the circuit board in a radial direction, and does not protrude from the support body in an axial direction. Accordingly, there are advantageous effects of package reduction and weight reduction of the inverter unit, cost reduction, and an increased degree of design freedom, and the overall length of the electric compressor can also be reduced.

In addition, since the high-voltage connector and the low-voltage connector are integrally configured in the support body, separate bolts and processing are unnecessary, thereby reducing the number of parts and weight, reducing costs, and increasing productivity.

In addition, even if the support body is made of a plastic material for cost reduction and light weight, electromagnetic waves can be shielded by the electromagnetic wave shielding member.

In addition, since the intelligent power module (IPM) directly contacts the housing, heat dissipation performance may be improved.

The effects of the embodiments of the present disclosure are not limited to the above-mentioned effects, and it should be understood that the effects of the present disclosure include all effects that could be inferred from the configuration of the invention described in the detailed description of the invention or the appended claims.

DESCRIPTION OF AN EMBODIMENT

Figure 1:
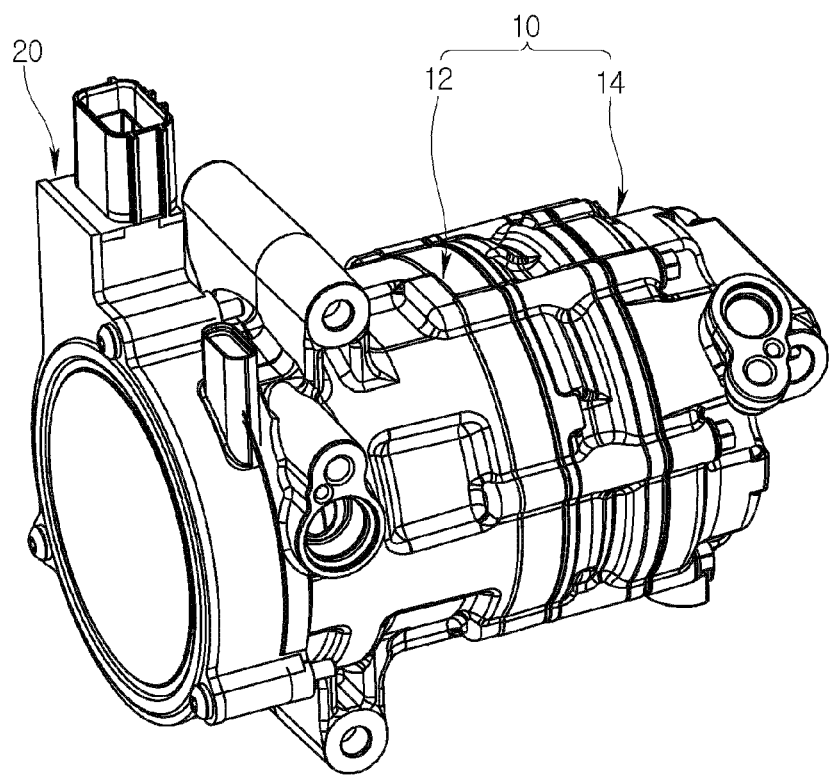
FIG. 1 is a perspective view illustrating an electric compressor according to an embodiment of the present disclosure.

Hereinafter, exemplary embodiments of the electric compressor of the present disclosure will be described with reference to the accompanying drawings.

In addition, terms used herein are defined in consideration of functions in the present disclosure, and may vary according to user's or operator's intention or practices, and the following embodiments do not limit the scope of the present disclosure, but are merely examples of the components presented in the claims.

In addition, parts irrelevant to the description are omitted for clarity of description, and same or similar components are assigned with the same reference numerals throughout the specification. It will also be understood that the terms "comprises" and "includes" used herein specify the presence of stated elements, but do not preclude the presence or addition of other elements, unless otherwise defined.

Figure 2:
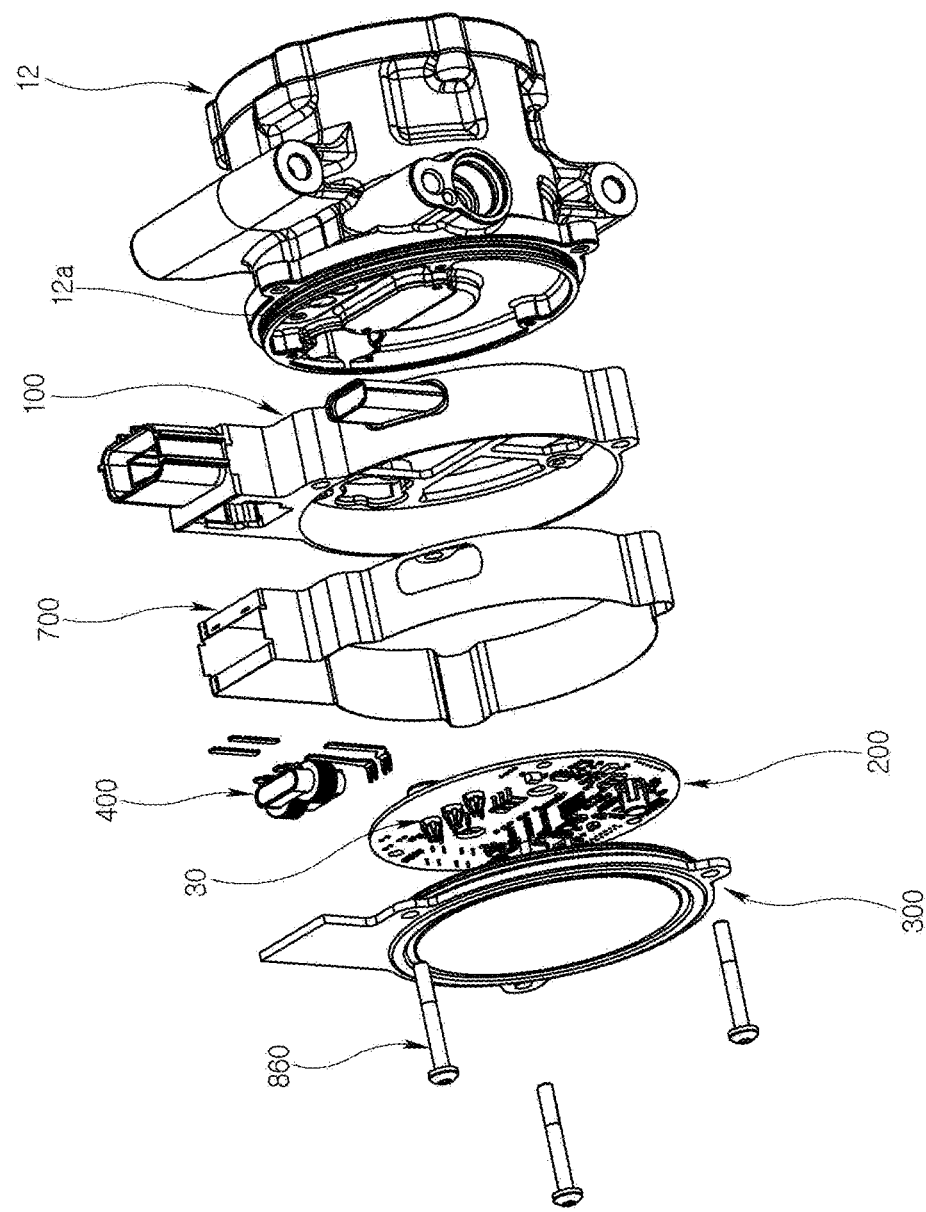
FIG. 2 is a perspective view separately illustrating a part of an electric compressor in FIG. 1.
Figure 3:
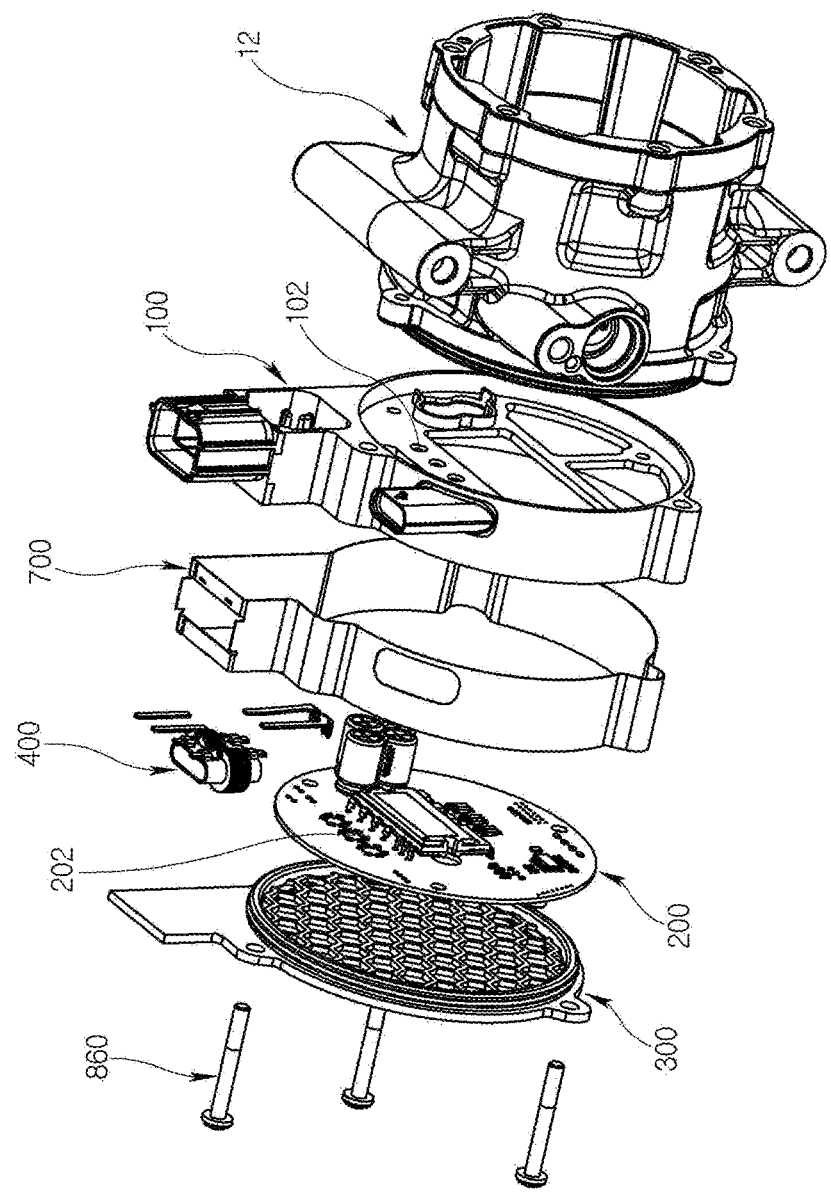
FIG. 3 is a perspective view of another side of FIG. 2.

First, the configuration of the electric compressor 1 according to an embodiment of the present disclosure will be briefly described with reference to FIGS. 1 to 3.

The electric compressor of the present disclosure largely includes a housing 10, a motor unit, a compression unit, an inverter unit 20, and a terminal unit 30 electrically connecting the motor unit and the inverter unit 20.

The housing 10 forms an exterior of the electric compressor 1, and in this embodiment, the housing 10 consists of a front housing 12 and a rear housing 14.

The motor unit is provided in the front housing 12, and provides power for compressing a refrigerant to the compression unit. Although not illustrated, the motor unit may include a rotor coupled to a rotary shaft rotatably installed at a center part of the front housing 12 and a stator fixed to the front housing 12 and disposed radially outside the rotor. Also, the stator may include a stator core and coils wound around the stator core.

The compression unit is provided in the rear housing 14 and although not illustrated, may include an orbiting scroll coupled to the rotary shaft through an eccentric bush, and a fixed scroll fixed between the front housing 12 and the rear housing 14 to form a compression chamber in which the refrigerant is compressed together with the orbiting scroll. As such, since the compression unit is connected to the motor unit through the rotary shaft, the rotational force generated by the motor unit may be transmitted to the orbiting scroll of the compression unit through the rotary shaft. However, it is not limited thereto, and it is apparent that other types of compression units may be used.

The inverter unit 20 is coupled to one side of the housing 10 which is an opposite side of the compression unit with respect to the motor unit. The inverter unit 20 is electrically connected to the motor unit, supplies power to the motor unit and controls operations by means of power and control signals transmitted from an outside. Specifically, the stator forms an electromagnetic field by power applied from the inverter unit 20, and rotational force for driving the compression unit is generated as the rotor rotates by the electromagnetic field formed by the stator.

At this time, the motor unit and the inverter unit 20 may be electrically connected to each other by the terminal unit 30. Since a three-phase motor is used in this embodiment, three terminals 34 and three connection pins 32 connected to the three phases respectively in order to supply three-phase power from the inverter unit 20 to the motor unit are provided. The three connection pins 32 are connected to the three-phase coils of the stator, respectively, pass through the front housing 12 and protrude toward an inside of the inverter unit 20. Each of the connection pins 32 protruding to the inside of the inverter unit 20 penetrates a circuit board 200 of the inverter unit and is electrically connected to the circuit board 200 through respective terminals 34. To this end, through-holes 12a, 102, and 202 through which connection pins pass may be formed in one side of the front housing 12, the support body 100, and the circuit board 200, respectively.

Hereinafter, the inverter unit 20 will be described in detail with reference to FIGS. 2 to 5. The inverter unit 20 may largely include a support body 100, the circuit board 200, an inverter cover 300, a noise reduction element 400, a high voltage connector 500, a low voltage connector 600, and an electromagnetic wave shielding member 700.

The support body 100 is disposed on one side of the front housing 12, and the circuit board 200 to which the switching elements 220 are connected is seated on the support body 100. In this embodiment, the support body 100 includes a circular center part 120 on which the circuit board 200 is seated. The support body 100 may be made of a plastic material for cost reduction and weight reduction. At this time, even if the support body 100 is made of a plastic material, a metal electromagnetic wave shielding member 700 is provided to surround the support body 100 so as to be able to shield electromagnetic waves. Depending on the embodiment, the electromagnetic wave shielding member 700 may be provided along an inner circumference of the support body 100.

Figure 6:
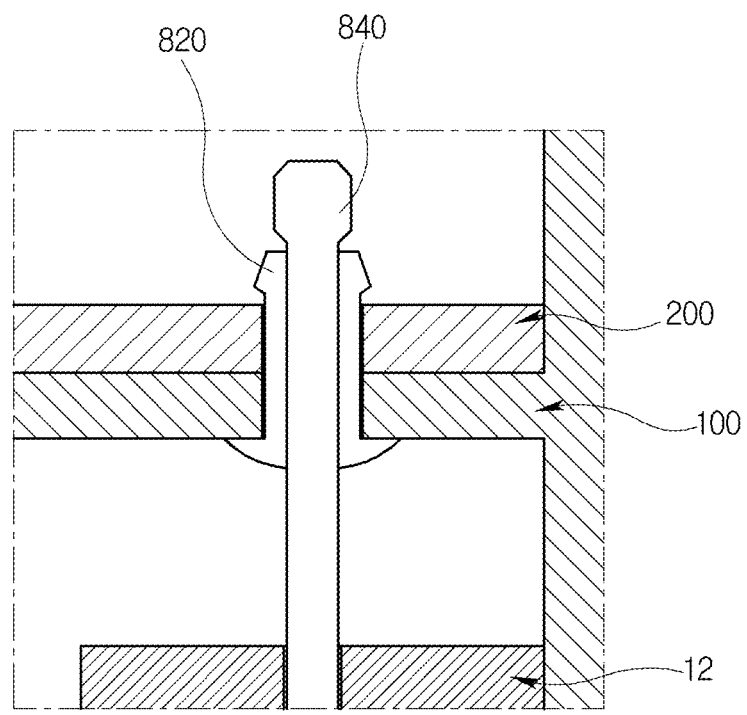
FIG. 6 is a cross-sectional view illustrating a coupling relationship between a circuit board and a support body.

Fastening holes 104 and 204 for fastening the circuit board 200 and the support body 100 are provided in the support body 100 and the circuit board 200, respectively. As illustrated in FIG. 6, a speed rivet 820 may be installed by penetrating the support body 100 and the circuit board 200 at the same time. Here, since the support body 100 is made of a plastic material and is not grounded, a bolt 840 penetrates the speed rivet 820 and is installed to the front housing 12 so that the grounding can be made.

Figure 4:
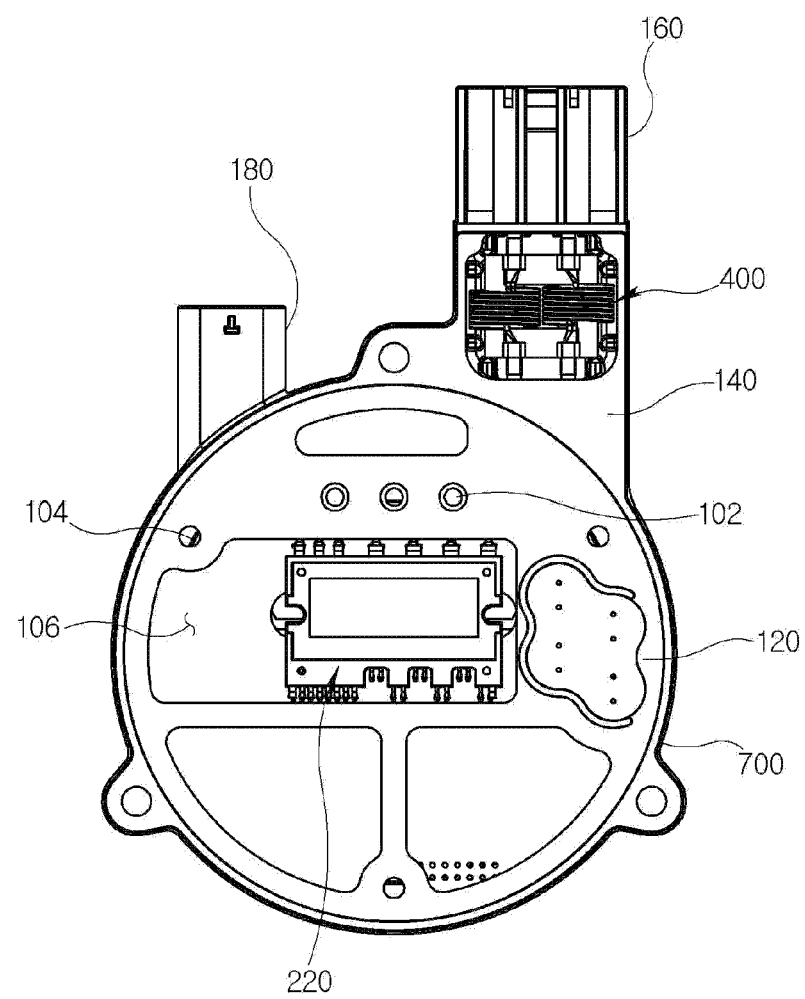
FIG. 4 is a front view separately illustrating a support body of FIG. 1.
Figure 7:
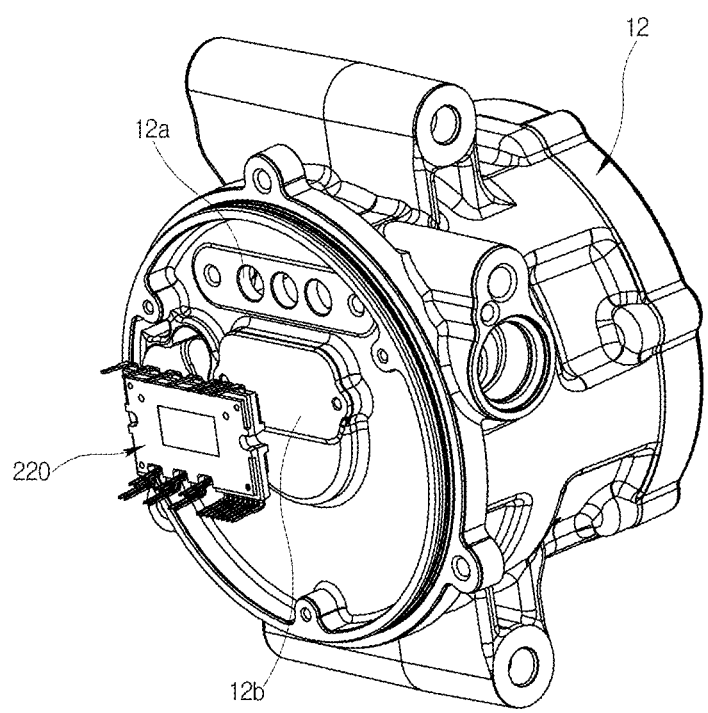
FIG. 7 is an enlarged perspective view of an intelligent power module (IPM) and a front housing.

In addition, slots for the switching elements may be formed in the center part 120 of the support body 100. As illustrated in FIGS. 3, 4 and 7, in this embodiment, the intelligent power module (IPM) 220 connected to the circuit board 200 may be in contact with the front housing 12 through the slot 106. To this end, one side of the front housing 12 is provided with a protrusion 12b protruding toward the support body 100 so that the intelligent power module 220 can come into contact with the front housing 12. As such, since the intelligent power module 220 directly contacts the front housing 12, heat dissipation performance may be improved. The intelligent power module 220 may be directly fastened to the front housing 12 using bolts, without using a carrier.

In the present disclosure, the noise reduction element 400 is installed in the support body 100 in a way to be disposed radially outside the circuit board 200. To this end, the support body 100 includes a first receiving part 140 extending radially outward from the center part 120 and in which the noise reduction element 400 is disposed. The center part 120 and the first receiving part 140 may be integrally formed. In this way, since the noise reduction element 400 is disposed outside the circuit board 200 in a radial direction and particularly, does not protrude from the support body 100 in an axial direction, the electric compressor can be compactly formed. The noise reduction element 400 may be, for example, a CM choke (common mode choke).

Figure 5:
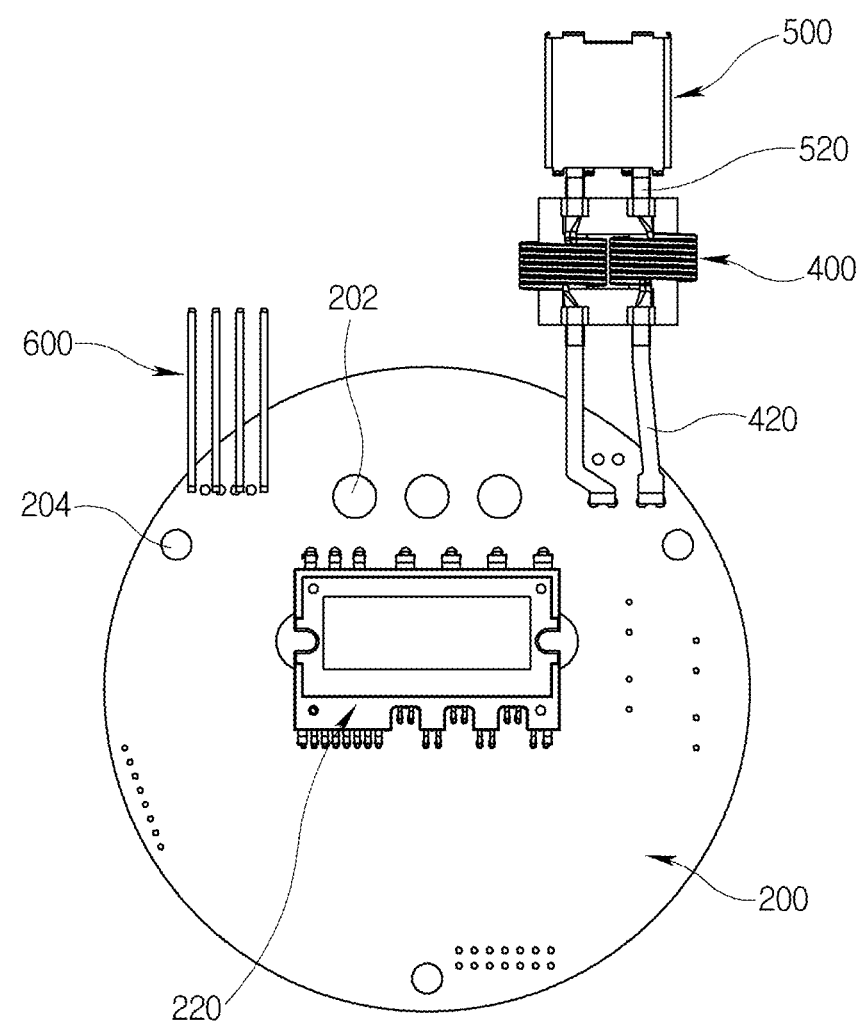
FIG. 5 is a front view illustrating some configurations of FIG. 4

In addition, the support body 100 further includes a second receiving part 160 disposed in a line on the radially outer side of the first receiving part 140, and in which the high voltage connector 500 is disposed. Here, the second receiving part 160 may be a housing of the high voltage connector itself. As the high voltage connector 500 is disposed in a line on a radially outer side of the noise reduction element 400, the connection between the high voltage connector 500 and the noise reduction element 400 is made easy and can be configured more compactly. At this time, as shown in FIG. 5, the high voltage connector 500 is electrically connected to the noise reduction element 400 through a first bus bar 520, and the noise reduction element 400 is electrically connected to the circuit board 200 through a second bus bar 420. The noise reduction element 400 may be easily integrated into the support body 100 by being welded to the first bus bar 520 and the second bus bar 420, respectively.

In addition, the support body 100 further includes a third receiving part 180 extending radially outward from the center part 120 and in which the low voltage connector 600 is disposed. Here, the third receiving part 180 may be a housing of the low voltage connector itself. In this way, since the low voltage connector 600 also does not protrude from the support body 100 in the axial direction, the electric compressor can be compactly formed. In this embodiment, the first receiving part 140 and the third receiving part 180 extend in parallel from the center part 120 toward the same direction. As shown in FIG. 5, the low voltage connector 600 is electrically connected directly to the circuit board 200.

The inverter cover 300 is coupled to one side of the support body 100, and covers the first receiving part 140 and the center part 120 of the support body in this embodiment. That is, the high voltage connector 500 and the low voltage connector 600 are not disposed inside the inverter cover 300. A fastening member 860 passes through the inverter cover 300 and the support body 100 and is installed to the front housing 12, such that the inverter cover 300 and the support body 100 can be fastened to one side of the front housing 12.

Figure 8:
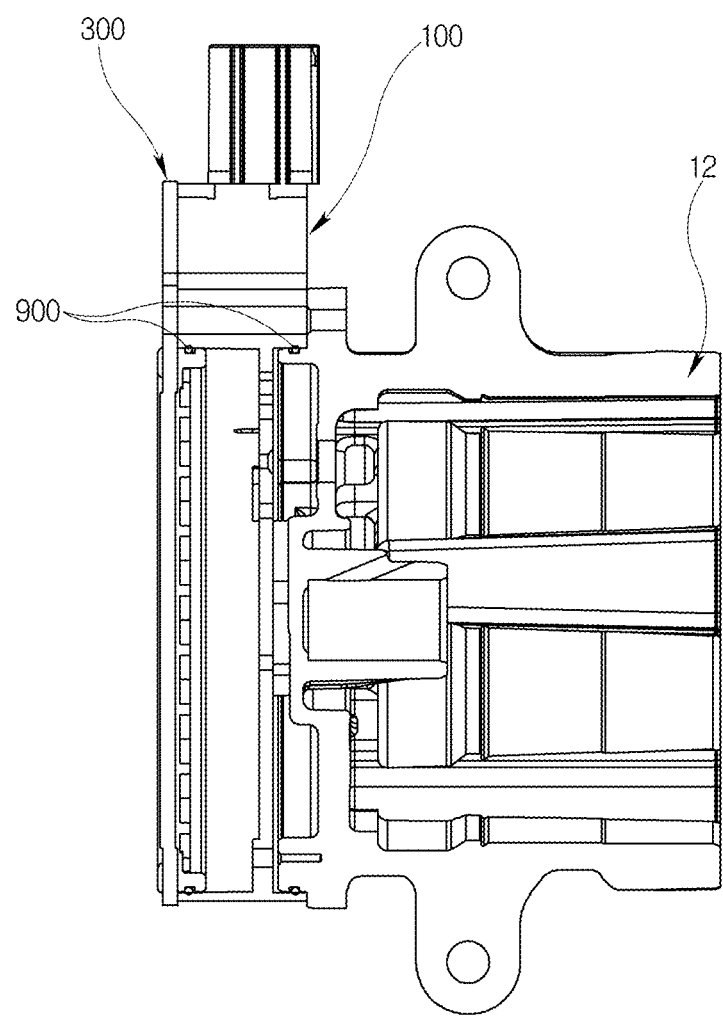
FIG. 8 is a partial cross-sectional view of FIG. 1.

At this time, sealing members 900 are disposed between the inverter cover 300 and the support body 100, and between the support body 100 and the front housing 12, respectively. Specifically, as shown in FIG. 8, circular protrusions are formed on the sides facing the support body 100 in the inverter cover 300 and the front housing 12, respectively, and the circular protrusions are coupled to contact inner surfaces of the support body 100, O-rings are provided as sealing members 900 between the surfaces in contact with each other.

According to the present disclosure, as the noise reduction element 400 is disposed on a radially outer side of the circuit board 200, and does not axially protrude from the support body 100, it is possible to reduce a size of the circuit board 200 and a length of the inverter cover 300. Accordingly, there are advantageous effects of package reduction and weight reduction of the inverter unit 20, cost reduction, and an increased degree of design freedom, and the overall length of the electric compressor 1 can also be reduced.

In addition, since the high-voltage connector and the low-voltage connector are integrally configured in the support body, separate bolts and processing are unnecessary, thereby reducing the number of parts and weight, reducing costs, and increasing productivity.

The present disclosure is not limited to the above-described specific embodiments and descriptions, and various modifications may be made by those skilled in the art without departing from the gist of the present disclosure claimed in the claims. Such variations are within the protection scope of the present disclosure.

The present disclosure relates to an electric compressor capable of reducing a size and lightening weight of a package of an inverter unit, as a noise reduction element is disposed on a radially outer side of a circuit board of an inverter unit, and a high voltage connector, a noise reduction element, and a low voltage connector are integrated into a support body.

What is claimed is:

1. An electric compressor, comprising:
   a housing;
   a compression unit provided in the housing;
   a motor unit provided in the housing to drive the compression unit; and
   an inverter unit coupled to one side of the housing and controlling the motor unit,
   wherein the inverter unit further comprises:
      a support body coupled to the one side of the housing; and
      an inverter cover coupled to one side of the support body; and
   wherein the support body further comprises:
      a center part allowing a circuit board to be seated thereon;
      a first receiving part extending from a radially outer side of the center part, and having a noise reduction element disposed therein; and
      a second receiving part disposed in a line on a radially outer side of the first receiving part and has a high voltage connector disposed therein, wherein the high voltage connector is connected to the noise reduction element through a first bus bar, and the noise reduction element is connected to the circuit board through a second bus bar, and wherein the high voltage connector, the noise reduction element and the circuit board are integrated into the support body;
      wherein an intelligent power module (IPM) connected to the circuit board is in contact with the housing.

2. The electric compressor of claim 1, wherein the support body further comprises a third receiving part extending from the radially outer side of the center part and having a low voltage connector disposed therein.

3. The electric compressor of claim 2, wherein the first receiving part and the third receiving part extend in parallel in a same direction from the center part.

4. The electric compressor of claim 1, wherein the inverter cover covers the center part and the first receiving part.

5. The electric compressor of claim 1, further comprising a metal electromagnetic wave shielding member surrounding the support body.

6. The electric compressor of claim 1, wherein a first sealing member is disposed between the inverter cover and the support body, and a second sealing member is disposed between the support body and the housing.

7. The electric compressor of claim 1, wherein a fastening member is installed to the housing by penetrating the inverter cover and the support body.

8. The electric compressor of claim 1, wherein a protrusion protruding toward the support body is provided on the one side of the housing so as to be contactable with the intelligent power module (IPM).

9. The electric compressor of claim 1, wherein the noise reduction element is welded to the first bus bar and the second bus bar.

10. The electric compressor of claim 1, wherein the noise reduction element is a common mode (CM) choke.

11. An electric compressor, comprising:
    a housing;
    a compression unit provided in the housing;
    a motor unit provided in the housing to drive the compression unit; and
    an inverter unit coupled to one side of the housing and controlling the motor unit,
    wherein the inverter unit further comprises:
       a support body coupled to the one side of the housing; and
       an inverter cover coupled to one side of the support body; and
    wherein the support body further comprises:
       a center part allowing a circuit board to be seated thereon; and
       a first receiving part extending from a radially outer side of the center part, and having a noise reduction element disposed therein, wherein a speed rivet is installed to penetrate the circuit board and the support body, and a bolt is installed to the housing by penetrating the speed rivet.

* * * * *